United States Patent
Hang

(10) Patent No.: US 7,801,308 B1
(45) Date of Patent: Sep. 21, 2010

(54) SECURE KEY ENCODING FOR CONTENT PROTECTION

(75) Inventor: Chia Lun Hang, Morgan Hill, CA (US)

(73) Assignee: Integrated Device Technology, Inc., San Jose, CA (US)

( * ) Notice: Subject to any disclaimer, the term of this patent is extended or adjusted under 35 U.S.C. 154(b) by 1100 days.

(21) Appl. No.: 11/458,003

(22) Filed: Jul. 17, 2006

(51) Int. Cl.
*H04L 9/14* (2006.01)

(52) U.S. Cl. ........................ 380/277; 380/278

(58) Field of Classification Search ............ None
See application file for complete search history.

(56) References Cited

U.S. PATENT DOCUMENTS

| | | | |
|---|---|---|---|
| 6,983,365 B1 | 1/2006 | Douceur | |
| 7,023,998 B2 | 4/2006 | Garay | |
| 7,242,772 B1 * | 7/2007 | Tehranchi | 380/223 |
| 7,545,943 B2 * | 6/2009 | Kamibayashi et al. | 380/277 |
| 2002/0141589 A1 | 10/2002 | Garay | |

* cited by examiner

*Primary Examiner*—Gilberto Barron, Jr.
*Assistant Examiner*—Abdulhakim Nobahar
(74) *Attorney, Agent, or Firm*—Michael R. Hardaway; Kenneth Glass; Glass & Associates

(57) ABSTRACT

A device and method for protecting HDCP cryptographic keys are presented herein. The device and method include receiving a set of HDCP cryptographic keys, encoding the set of HDCP cryptographic keys such that the resultant encoded cryptographic data is enabled to be represented in rows and columns, and storing the set of keys in a storage device of an HDCP appliance in the rows and columns, wherein at least one of the rows does not include a complete cryptographic key and at least one of the columns does not include a complete cryptographic key. The method can use block interleaving or convolution interleaving encoding.

21 Claims, 8 Drawing Sheets

| 301 | 302 | 303 |
|---|---|---|
| k1 | 0x 9591CAB2F4EEA5 | 0b 1001010110010001110010101011001011110100111011101010101 |
| k2 | 0x CE66EC9CF7D5A6 | 0b 1100111001100110111011001001110011110111110101011010110 |
| k3 | 0x F6A9A7D6DDA8BB | 0b 1111011010101001101001111101011011011101101010001011101 |
| k4 | 0x BE5B6AF6BE58C4 | 0b 1011111001011011011010101111011010111110010110001100010 |
| k5 | 0x A579A263FBFBCD | 0b 1010010101111001101000100110001111111011111110111100110 |
| k6 | 0x 4730C7C2A8D4BC | 0b 0100011100110000100011111000010101010000101001011110 |
| k7 | 0x A212A7B4BCDFC8 | 0b 1010000100001001010100111101101001011110011011111100100 |
| k8 | 0x 91CAB2F4EEA59B | 0b 1001000111001010101100101111010011011101010010110011011 |
| k9 | 0x 66EC9CF7D5A6B3 | 0b 0110011011101100100111001111011111010101101001101011001 |
| k10 | 0x A9A7D6DDA8BB5D | 0b 1010100110100111110101101101110110101000101110110101110 |
| k11 | 0x 5B6AF6BE58C470 | 0b 0101101101101010111101010111110010110001100010001110000 |
| k12 | 0x 79A263FBFBCD13 | 0b 0111100110100010011000111111101111111011110011010001001 |
| k13 | 0x 30C7C2A8D4BC4A | 0b 0011000011000111100001010101000110101001011110001001010 |
| k14 | 0x 12A7B4BCDFC89C | 0b 0001001010100111101101001011100110111111100100010011100 |
| k15 | 0x CAB2F4EEA59BBD | 0b 1100101010110010111101001101110101001011001101110111101 |
| k16 | 0x EC9CF7D5A6B388 | 0b 1110110010011001111011110101011010011010110011000111000 |
| k17 | 0x A7D6DDA8BB5DB8 | 0b 1010011111010110110111011010100010111011010110110111000 |
| k18 | 0x 6AF6BE58C470F3 | 0b 0110101011110110101111100101100011000100011100001110011 |
| k19 | 0x A263FBFBCD1344 | 0b 1010001001100011111101111111101111001101000100110100010 |
| k20 | 0x C7C2A8D4BC4A3F | 0b 1100011110000101010100011010100101111000100101000111111 |
| k21 | 0x A7B4BCDFC89C29 | 0b 1010011110110100101111001101111110010000100110000101001 |
| k22 | 0x B2F4EEA59BBD45 | 0b 1011001011110100110111010100101100110111011110101000101 |
| k23 | 0x 9CF7D5A6B3880F | 0b 1001110011110111110101011010011010110011100010000000111 |
| k24 | 0x D6DDA8BB5DB82A | 0b 1101011011011101101010001011101101011101101110000010101 |
| k25 | 0x F6BE58C470F33C | 0b 1111011010111110010110001100010001100001111001100111100 |
| k26 | 0x 63FBFBCD1344CC | 0b 0110001111111011111101111001101000100110100010011001100 |
| k27 | 0x C2A8D4BC4A3F49 | 0b 1100001010100010110101001011110001001010001111101001001 |
| k28 | 0x B4CDFC89C2945 | 0b 1011010010111100110111111100100010011100001010010100010 |
| k29 | 0x F4EEA59BBD4514 | 0b 1111010011101110100101100110110111101010001010000101 |
| k30 | 0x F7D5A6B3880F3C | 0b 1111011111010101101001101011001110000000001111001111 |
| k31 | 0x DDA8BB5DB82AA2 | 0b 1101110110101000101110110101110110111000001010101000010 |
| k32 | 0x BE58C470F33C23 | 0b 1011111001011000110001000111000011110011001111000100011 |
| k33 | 0x FBFBCD1344CC6B | 0b 1111101111111011110011010001001101000100110011000110111 |
| k34 | 0x A8D4BC4A3F49DC | 0b 1010100011010100101111000100101000111111010010011101100 |
| k35 | 0x BCDFC89C2945F3 | 0b 1011110011011111110010001001110000101001010000101111011 |
| k36 | 0x EEA59BBD451422 | 0b 1110111010100101100110111011110101000101000101000100010 |
| k37 | 0x D5A6B3880F3C43 | 0b 1101010110100110101100111000100000001111001111000100011 |
| k38 | 0x A8BB5DB82AA2B6 | 0b 1010100010111011010111011011100000010101010001010110110 |
| k39 | 0x 58C470F33C23B7 | 0b 0101100011000100011100001111001100111100001011110110111 |
| k40 | 0x FBCD1344CC6BD0 | 0b 1111101111001101000100110100001001100011001011111010000 |

FIGURE 3

401
| k 1: | 1 (95) | 2 (91) | 3 (CA) | 4 (B2) | 5 (F4) | 6 (EE) | 7 (A5) |
|---|---|---|---|---|---|---|---|
| k 2: | 8 | 9 | 10 | 11 | 12 | 13 | 14 |
| k 3: | 15 | 16 | 17 | 18 | 19 | 20 | 21 |
| k 4: | 22 | 23 | 24 | 25 | 26 | 27 | 28 |
402
403
| 1  4 | 7  10 | 13  16  19 |
|---|---|---|
| 2  5 | 8  11 | 14  17  20 |
| 3  6 | 9  12 | 15  18  21 |
| 22  25 | 28 | |
| 23  26 | | |
| 24  27 | | |
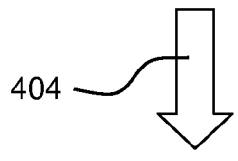
404
405
| 1 | 2 | 3 | 4 | 5 | 6 | 7 |
|---|---|---|---|---|---|---|
| 8 | 9 | 10 | 11 | 12 | 13 | 14 |
| 15 | 16 | 17 | 18 | 19 | 20 | 21 |
| 22 | 23 | 24 | 25 | 26 | 27 | 28 |
FIGURE 4A 411
| k 1: | 95 91 CA B2 F4 EE A5 |
| --- | --- |
| k 2: | CE 66 EC 9C F7 D5 A6 |
| k 3: | F6 A9 A7 D6 DD A8 BB |
| k 4: | BE 5B 6A F6 BE 58 C4 |
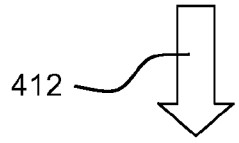
412
413
| 95 B2<br>91 F4<br>CA EE | A5 EC<br>CE 9C<br>66 F7 | D5 A9 DD<br>A6 A7 A8<br>F6 D6 BB |
| --- | --- | --- |
| BE F6<br>5B BE<br>6A 58 | C4 xx<br>xx xx<br>xx xx | xx xx xx<br>xx xx xx<br>xx xx xx |
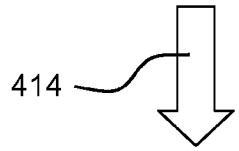
414
415
| k 1: | 95 91 CA B2 F4 EE A5 |
| --- | --- |
| k 2: | CE 66 EC 9C F7 D5 A6 |
| k 3: | F6 A9 A7 D6 DD A8 BB |
| k 4: | BE 5B 6A F6 BE 58 C4 |
FIGURE 4B 431
| k 1: | 1 (CE) | 2 (66) | 3 (EC) | 4 (9C) | 5 (F7) | 6 (D5) | 7 (A6) |
| k 2: | 8 (95) | 9 (91) | 10 (CA) | 11 (B2) | 12 (F4) | 13 (EE) | 14 (A5) |
| k 3: | 15 (F6) | 16 (A9) | 17 (A7) | 18 (D6) | 19 (DD) | 20 (A8) | 21 (BB) |
| k 4: | 22 (BE) | 23 (5B) | 24 (6A) | 25 (F6) | 26 (BE) | 27 (58) | 28 (C4) |
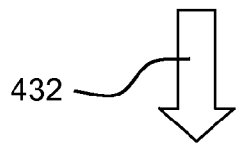
432
433
| 1 (CE) | 5 (F7) | 9 (91) | 13 (EE) | 17 (A7) | 21 (BB) | 25 (F6) |
| 2 (66) | 6 (D5) | 10 (CA) | 14 (A5) | 18 (D6) | 22 (BE) | 26 (BE) |
| 3 (EC) | 7 (A6) | 11 (B2) | 15 (F6) | 19 (DD) | 23 (5B) | 27 (58) |
| 4 (9C) | 8 (95) | 12 (F4) | 16 (A9) | 20 (A8) | 24 (6A) | 28 (C4) |
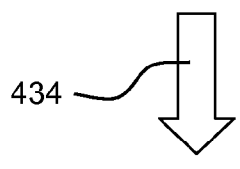
434
435
| k 1: | CE 66 EC 9C F7 D5 A6 |
| k 2: | 95 91 CA B2 F4 EE A5 |
| k 3: | F6 A9 A7 D6 DD A8 BB |
| k 4: | BE 5B 6A F6 BE 58 C4 |
FIGURE 4C

SECURE KEY ENCODING FOR CONTENT PROTECTION

BACKGROUND OF THE INVENTION

The continuing progress in the delivery of high-definition digital video to the consumer has brought with it new challenges in the protection of intellectual property rights. In earlier days, the digital content of a Digital Video Disk (DVD) movie was converted to an analog signal (played) on a DVD player that connected to a television by analog cables. If a would-be counterfeiter copied the analog signal to a new DVD, the analog degradation of the signal made for a reduced quality copy that was inferior to the original DVD. Copyright holders were somewhat comfortable with the competitive advantage that the quality difference gave them.

With the advent of very-high-resolution digital displays and the digital/digital conversion of content that feeds them, the ability of counterfeiters to produce high-quality copies of DVD movies, for example, is greatly enhanced. A Digital Video Interface (DVI) or High-Definition Multimedia Interface (HDMI) stream can be copied to a new DVD that can be an exact replica of the original. Copyright infringement can go undetected and copyright owners can find themselves holding property whose value is degraded.

A number of methods and devices have been developed to prevent illicit copying of digital content. One of these is High-bandwidth Digital Content Protection (HDCP). HDCP is a protocol designed for protecting audio-visual content over certain high-bandwidth interfaces, referred to as HDCP-protected Interfaces. HDCP-protected Interfaces include Digital Video Interface (DVI), High Definition Multimedia Interface (HDMI), and the onboard exchange of protected digital content within such open source platforms as personal computers.

In an HDCP System, two or more HDCP Devices are interconnected through an HDCP-protected Interface. The Audio-visual Content protected by HDCP, referred to as HDCP Content, flows from the Upstream Content Control Function into the HDCP System at the most upstream HDCP Transmitter. From there, the HDCP Content, encrypted by the HDCP System, flows to HDCP Receivers over HDCP-protected Interfaces.

HDCP Receivers decrypt the HDCP Content to audio and video suitable for human viewing. HDCP Receivers can also be HDCP Repeaters that serve as downstream HDCP Transmitters emitting the HDCP Content further downstream to additional HDCP Receivers.

HDCP uses an array of public and private digital keys to effect its protection. An HDCP device, such as a DVD player or a high-resolution monitor, is given a set of 40 fifty-six-bit private keys and a key-selection vector (KSV) at manufacture. The keys and KSV are assigned and validated by DCP and are stored in the HDCP appliance, typically in an EEPROM, flash memory device, or other long-term memory. The private cryptographic keys are typically stored in logically sequential storage locations, such as rows and columns or word-lines and bit-lines, with each row including an entire key. If a would-be counterfeiter, even if a legitimate purchaser, were to remove and read the EEPROM or other device on which the private keys are stored, the legitimate keys can be replicated and used in a non-legitimate device. In addition, when the keys and KSV are given to a contract manufacturer for storage in a specific product, there is the possibility that the keys and KSV can be used for non-authorized products.

Thus, there is a need for a method and apparatus that will protect private cryptographic keys from illegitimate copying and piracy. Such a method and apparatus must allow full compatibility and operability in the digital content protection environment.

SUMMARY OF THE INVENTION

A method and apparatus for protecting digital content protection keys is presented that protects private cryptographic keys from illegitimate copying and piracy. The method and apparatus of the present invention is fully compatible with, and operable within, the digital content protection environment.

A device and method for protecting digital content protection cryptographic keys are presented herein. The device and method include receiving a set of digital content protection cryptographic keys, encoding the set of digital content protection cryptographic keys such that the resultant encoded cryptographic data is enabled to be represented in rows and columns, and storing the set of keys in a storage device of an HDCP appliance in the rows and columns, wherein at least one of the rows does not include a complete cryptographic key and at least one of the columns does not include a complete cryptographic key. The method can use block interleaving or convolution interleaving encoding.

These and other advantages of the present invention will become obvious to those of ordinary skill in the art after having read the following detailed description of the preferred embodiments, which are illustrated in the various drawing figures.

BRIEF DESCRIPTION OF THE DRAWINGS

FIG. 3 illustrates a table containing an exemplary set of digital content protection cryptographic keys in accordance with an embodiment of the present invention.

FIG. 4A illustrates a logical diagram for encoding a set of digital content protection cryptographic keys in accordance with an embodiment of the present invention.

FIG. 4B illustrates a logical diagram for encoding a set of digital content protection cryptographic keys in accordance with an embodiment of the present invention.

FIG. 4C illustrates a logical diagram for encoding a set of digital content protection cryptographic keys in accordance with an embodiment of the present invention.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits will not be described in detail so as not to unnecessarily obscure aspects of the present invention.

Descriptions of embodiments of the present invention refer to the protocols of HDCP (High-bandwidth Digital Content Protection). HDCP is detailed in specification HDCP 1.1 developed and published by Digital Content Protection, LLC (DCP). Specification HDCP 1.1 is incorporated herein in its entirety.

Figure 1:
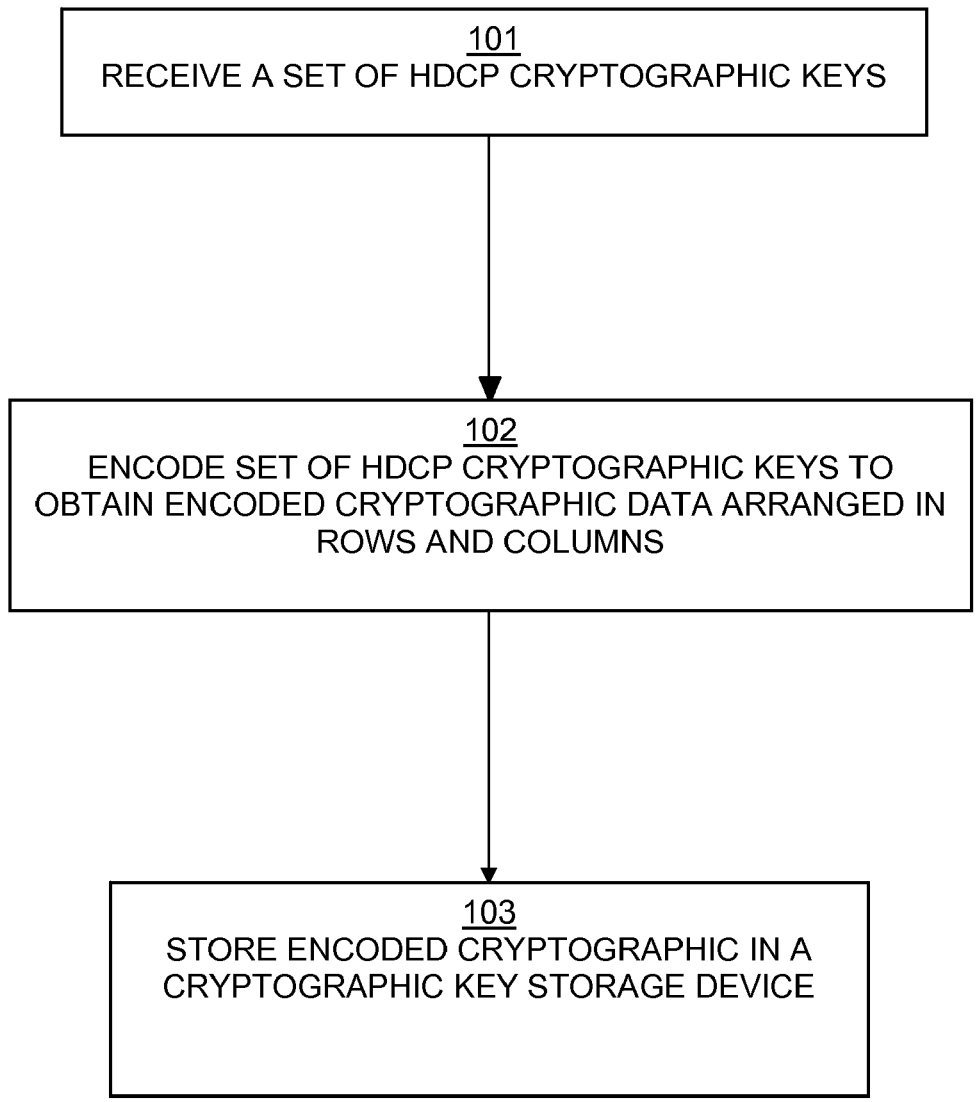
FIG. 1 illustrates a flow diagram of a method for secure HDCP key encoding in accordance with an embodiment of the present invention.

FIG. 1 illustrates an encoding method for secure storage of private cryptographic keys, such as those used in an HDCP system. Method 100 starts with receiving 101 a set of licensed private cryptographic keys from a licensed vendor. The licensed vendor can be the manufacturer of an HDCP appliance or another licensee of Digital Protection, LLC, the sole source of HDCP licenses and cryptographic keys. The appliance can be any high-bandwidth device enabled for HDCP protection. It can be a transmitting appliance such as a set-top box, a High-Def DVD player, a high definition television, a high-resolution display, an HDCP-enabled repeater or any other HDCP device enabled to authorize HDCP communications and to encrypt or decrypt HDCP-protected high-bandwidth digital content. The set of licensed keys stored in and used by an HDCP appliance are also known as private keys.

At step 102, the set of cryptographic keys is encoded. It is noted that an HDCP cryptographic key is fifty-six bits (seven bytes) in length, though other digital content protection schemes use keys of different lengths. The memory space required for storing the forty keys in an HDCP key set is, therefore, forty rows of seven byte-wide columns, or the equivalent. In one embodiment of the present invention, the logical arrangement of the storage of the cryptographic keys is forty rows high by fifty-six bits wide.

It is noted that the terms "rows" and "columns" are used herein to denote a logical concept of memory storage locations. The use of the terms herein does not necessarily imply a physical arrangement or location of memory storage locations. Private cryptographic keys are typically stored in logically sequential storage locations in a private key storage device, whether it is an EEPROM, flash memory or other storage device. A row, as referenced in this description, is any sequence of stored bytes normally comprising a complete private cryptographic key. However, when encoded by an embodiment of the present invention, the private cryptographic keys are not located in easily discovered, logically sequential, storage locations until they are decoded.

It is noted that a cryptographic key is a specific sequence of binary bits. In each embodiment of the present invention, the specific sequence in a key is convoluted or interleaved while stored in a storage device in a digital content appliance. The key is decoded, or restored, to its original sequence when required for use in encryption/decryption operations. Interleaving of private cryptographic keys for storage is not limited by the architecture of the private key storage device.

In one embodiment of the present invention, the encoding of the storage of the cryptographic keys is accomplished by interleaving the storage locations according to a block interleaving process. To accomplish the interleaving, a specific nibble or half bite is designated to be an encoding key. In this embodiment of the present invention, the vendor or manufacturer of the digital content protection appliance designates the nibble to be used as the encoding key. In the present embodiment, the first nibble of the first cryptographic key is the encoding key. In another embodiment, a different nibble is so designated.

In the present embodiment, the four bits of the designated key-encoding nibble are read, two bits at a time, to establish the dimensions of an interleaving matrix. The decimal equivalent of the first two bits, plus one, becomes the width W of the matrix. The decimal equivalent value of the second two bits, plus one, becomes the length L of the matrix. It is noted that the term matrix used here denotes a group of stored bytes that have a logical, if not physical, relationship.

Continuing in FIG. 1, at step 103, the licensed set of forty, fifty-six-bit, cryptographic keys is written into the storage element in the interleaved grouping of matrices of the dimensions established in step 102. The dimensions are followed flexibly so as to fill the available storage space.

Figure 2:
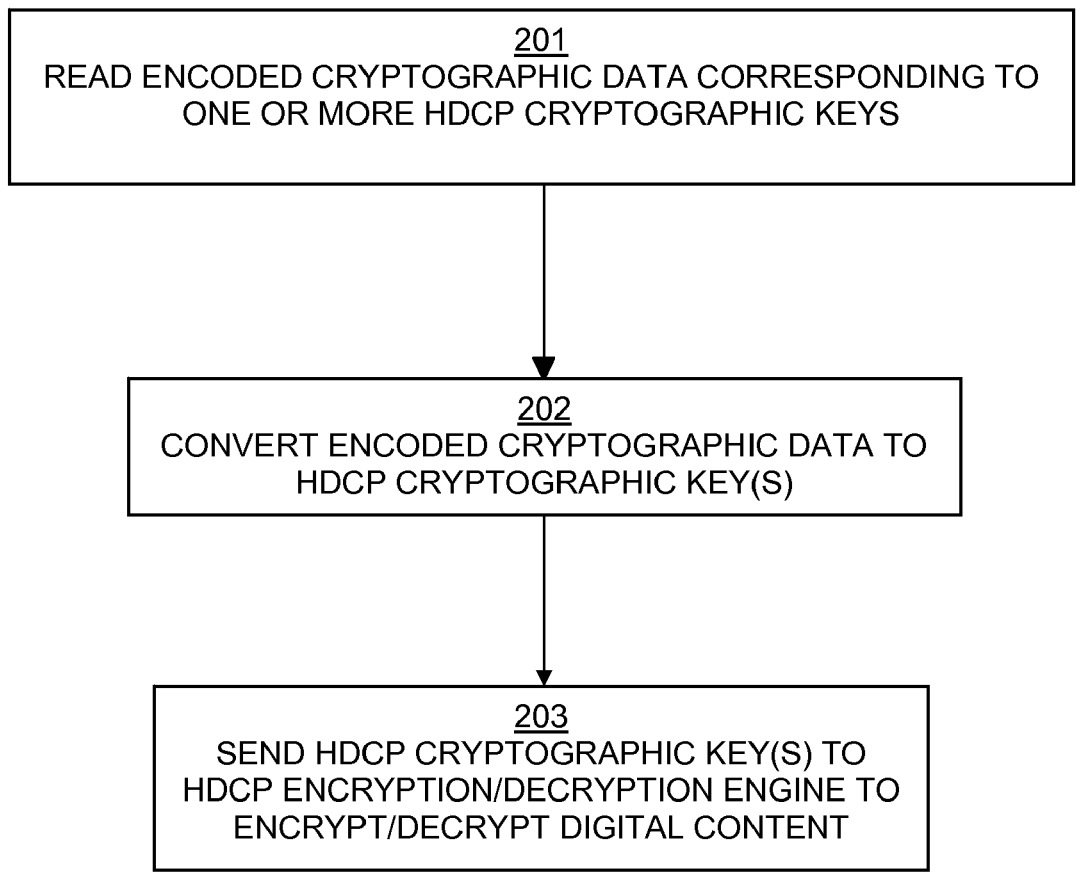
FIG. 2 illustrates a flow diagram of a method for decoding securely encoded HDCP keys in accordance with an embodiment of the present invention.

FIG. 2 illustrates a flow chart of a method for decoding cryptographic keys stored in accordance with an embodiment of the present invention. At step 201, in this embodiment of the present invention, the designated key byte storage location is read to determine the dimensions of the transposed or interleaved matrices of cryptographic key bytes. The first two bits of the designated nibble determine the post-decode width W and the second two bits determine the length of the matrices to be de-interleaved.

At 202, the set of encoded cryptographic keys is decoded by de-interleaving, or re-transposing, the interleaved matrices. In one embodiment, the set of keys is decoded as the keys are needed for HDCP authentication, encryption, or decryption. In another embodiment, the entire set of cryptographic keys is decoded and temporarily stored for encryption or decryption operations. The encoded stored data is restored to a valid, licensed, set of private cryptographic keys.

At step 203, the decoded cryptographic keys are sent to an encryption or decryption engine for use in cryptographic operations. In one embodiment of the present invention, the HDCP keys are decoded as they are used, since an HDCP operation may not require all forty keys at once. In another embodiment, however, the private cryptographic keys are decoded and stored for subsequent use. This can be done at each power-up of the digital content protecting appliance to which the set of HDCP keys are licensed.

FIG. 3 illustrates a table 300 containing an exemplary private cryptographic key set, comprising forty fifty-six-bit encryption keys, in accordance with an embodiment of the present invention. Column 303 presents the exemplary set of forty cryptographic keys in binary format. Column 302 shows the same keys in hexadecimal format. Column 301 lists associated key tags that are presented here solely for illustrative purposes. It is noted here that there are more than $7.02 \times 10^{16}$ possible combinations of fifty-six bits, however, some combinations are not usable as cryptographic keys by digital content protection protocols.

It is noted here that the first exemplary cryptographic key, shown at the top of table 300 in FIG. 3, is tagged as "k1" and is denoted in hexadecimal notation as "0x9591CAB2F4EEA5". In Binary notation, the first byte of key k1 (0x95) is "0b10010101".

In a key storage device, implemented as an EEPROM, a flash memory device, or in some other storage medium, private cryptographic keys can be stored in logical memory rows and columns. Commonly, a logical row corresponds to one key. In this embodiment of the present invention, the keys are encrypted by the licensed appliance vendor, and are stored in a private key storage device. The keys are stored in such a way that only the vendor's appliance can extract the keys for usable encryption or decryption. More particularly, a vendor can implement a device separate from a private key storage device that contains the encode/decode logic incorporated in embodiments of the present invention.

FIG. 4A illustrates secure storage encryption in accordance with one embodiment of the present invention. In table 401 in FIG. 4, cryptographic keys k1-k4 are shown in a typical storage in a private key storage device. It is noted that a fifty-six-bit cryptographic key comprises seven bytes. In this illustration, the seven bytes of key k1 are tagged as bytes 1-7. The seven bytes of key k2 are tagged as 8-14, the seven bytes of key k3 are tagged as 15-21, and the seven bytes of key k4 are tagged as 22-28.

In table 401 key k1 is stored in the first logical row. The first byte of k1, byte 1 (0x95), is stored in the first memory location of the first row, the second byte of k1, byte 2 (0x91), is stored in the second location of the first row, and so forth to the seventh byte, byte 7 (0xA5), stored in the seventh location in the first row. Keys k2-k4 are similarly arrayed so that bytes 8-14 (key k2) are stored in the second memory row, bytes 15-21 (key k3) are stored in the third row, and bytes 22-28 (key k4) are stored in the fourth row. It is noted that the rows and locations referred to here are logical references only and do not necessarily imply a physical relationship. This typical logical arrangement of stored bytes is what is changed by embodiments of the present invention.

In this embodiment of the present invention, the storage of the cryptographic keys is encoded by block interleaving, an encoding method commonly used in communications. In this application of the method, blocks of stored data are exchanged in location with other blocks in order to be in locations that an illicit device cannot predict. The blocks here are data bytes within the cryptographic keys. Encoding 402 causes the storage of the four cryptographic keys in this example to be stored in such a way as to be unreadable by any device that does not know the key to the interleaving.

Table 402 in FIG. 4A shows the result of one example of encoding available to embodiments of the present invention. The key to the encoding is the first half of the first byte in cryptographic key k1. The first byte of k1 is 0x95. The first half byte, or nibble, 0x9, is four bits, 0b1001. In this embodiment, the first nibble is used to define an interleaver length and width. For this example, interleaver width, W, is defined as the decimal value of the first two bits in the nibble plus 1. 0b10=2, 2+1=3. Thus interleaver width W=3. The interleaver length, L, is defined as the decimal value of the second two bits of the nibble plus 1. 0b01=1. 1+1=2. Thus the interleaver length L=2.

The interleaving organizes the stored data in matrices of W width by L length. In this example, the matrices are three columns wide by two rows in length. The matrices are then transposed and Table 403 in FIG. 4A illustrates the result of the transposing. The first three bytes in the first row become the first three bytes in the first column in the first transposed matrix. The second three bytes become the first three bytes in the second column in the first matrix. The last byte of k1, byte 7, is the first byte of the first column of the second matrix, and the first two bytes of k2, bytes 8 and 9, become the second and third bytes of the first column of the second matrix. The next three bytes in k2, bytes 10-12, become the three bytes in the second column of the second matrix.

It is noted that the private key storage device here is arranged in seven byte columns by 40 key rows. This means that there are seven columns into which to fit three, two-column transposed matrices. In order to fill the rows, the third matrix in this example is expanded to a 3×3 matrix. The expansion puts bytes b13-b15 in the first column of the third matrix, bytes b16-b18 in the second column, and bytes b19-b21 in the third column.

The interleaving described in this embodiment produces a first row comprising fifty-six bits (0x 95B2A5ECD5A9DD), which is not one of the licensed digital content protection keys. To an illicit copier, these fifty-six bits are indistinguishable from a legitimate key but cannot be used as a cryptographic key in conjunction with the other keys in the set. However, the licensed vendor's legitimate appliance, knowing which nibble of which byte was used as the key for interleaving, has the additional logic, which can be implemented in firmware or hardware or some other mode, to extract the keys from encoded storage.

The licensed appliance, in the present embodiment, automatically converts 404 the encoded key data into its original format by reading, sequentially, rows 1 to 3 in the first and second column of each transposed matrix block. The blocks, it is noted, are ordered, logically, form left to right in the illustration of FIG. 4A. The private cryptographic keys are in restored order in table 405.

FIG. 4B illustrates the encoding and decoding of the four exemplary cryptographic keys of FIG. 4A, using exemplary cryptographic keys to further illuminate concepts presented in the present application. In Table 411 in FIG. 4B, exemplary cryptographic keys k1-k4 are shown in hexadecimal form as 0x9591 CAB2F4EEA5, 0xCE66EC9CF7D5A6, 0xF6A9A7D6DDA8BB, and 0xBE5B6AF6BE58C4, respectively. Table 413 in FIG. 4B shows the result of encoding 412 in this embodiment. Decoding 414 returns the cryptographic keys to their original configuration as above and as shown in Table 415. Once decoded, the keys are in condition to be used in encryption/decryption operations.

Continuing the example of FIG. 4A, the first byte, 0x95, yields a first nibble of 0x9, or 0b1001. The first two bits are 0b10, which equals 2. 2+1=3, thus the width of the interleaving matrix is 3. The second two bits are 0b01, which equals 1. 1+1=2, establishing the matrix length as 2. As discussed in reference to the embodiment illustrated in FIG. 4A, each grouping of bytes, three wide by two high, is transposed, or interleaved, into a matrix two bytes wide by three high. In the example referenced in FIG. 4C, where the designated bye is 0xCE and the encoding key nibble is 0xC (0b1100), a matrix size of four bytes wide by one high is yielded (0b11=3, 3+1=4; 0b00=0, 0+1=1).

FIG. 4C illustrates encoded secure storage of private cryptographic keys in accordance with an embodiment of the present invention. In table 431 in FIG. 4C, cryptographic keys k1-k4 are again shown in a typical storage in a storage device. In this illustration, as before, the seven bytes of key k1 are tagged as bytes 1-7. The seven bytes of key k2 are tagged as 8-14, the seven bytes of key k3 are tagged as 15-21, and the seven bytes of key k4 are tagged as 22-28. In this embodiment, the first exemplary key k1 is 0xCE66EC9CF7D5A6.

In table 431 key k1 is stored in the first logical row. The first byte of k1, byte 1 (0xCE), is stored in the first memory location of the first row, the second byte of k1, byte 2 (0x66), is stored in the second location of the first row, and so forth to the seventh byte, byte 7 (0xA6), stored in the seventh location in the first row. Again, keys k2-k4 are similarly arrayed so that bytes 8-14 (key k2) are stored in the second memory row, bytes 15-21 (key k3) are stored in the third row, and bytes 22-28 (key k4) are stored in the fourth row.

In this embodiment of the present invention, as previously illustrated, the storage of the private cryptographic keys is encoded by block interleaving. Encoding 432, based in this implementation on the first nibble of k1, causes the storage of the four exemplary cryptographic keys in this example to be stored in such a way as to be unreadable by any device that does not know the key to the interleaving. It is noted that the encoding key for secure encoding of stored cryptographic keys, shown here as the first nibble of key k1, is not limited to a specific nibble. A licensed vendor can elect a different encoding key.

Table 402 in FIG. 4C shows the result of one example of encoding available to embodiments of the present invention. The key to the encoding is the first half of the first byte in cryptographic key k1. The first byte of k1 is 0xCE. The first half byte, or nibble, 0xC, is four bits, 0b1100. In this embodiment, the first nibble is used to define an interleaver length and width. For this example, interleaver width, W, which is defined as the decimal value of the first two bits in the nibble plus 1, is 0b11=3, 3+1=4. Thus interleaver width W=4. The interleaver length, L, is defined as the decimal value of the second two bits of the nibble plus 1. 0b00=0. 0+1=1. Thus in this example, the interleaver length L=1.

The interleaving organizes the stored data in matrices of W width by L length. In this example, the matrices are four columns wide by one row in length. The matrices are then transposed and Table 433 in FIG. 4A illustrates the result of the transposing. The first four bytes in the first row become the first four bytes in the first column in the first transposed matrix. The next three bytes in the seven-byte row plus the first byte in the second row become the first four bytes in the second column in the first matrix. The second through fifth bytes of k2, bytes 9-12, become the four bytes of the first and only column of the third matrix, and the last two bytes of k2, bytes 13 and 14, become the first and second bytes of the fourth matrix. The first two bytes in k3, bytes 15 and 16, become the last two bytes in the fourth 4×1 matrix.

The interleaving described in this embodiment produces a first row comprising fifty-six bits (0x CEF791 EEA7BBF6), which is not one of the licensed private cryptographic keys of the present appliance. Again, only, the licensed vendor's legitimate appliance, knowing which nibble of which byte was used as the key for interleaving, has the additional firmware to extract the keys from encoded storage.

The licensed appliance, in the present embodiment, automatically converts 434 the encoded key data into its original format by reading sequentially rows 1 to 4 in each transposed matrix block. The blocks, it is noted, are ordered, logically, form left to right in the illustration of FIG. 4C. The cryptographic keys are in restored order in table 435.

Figure 5:
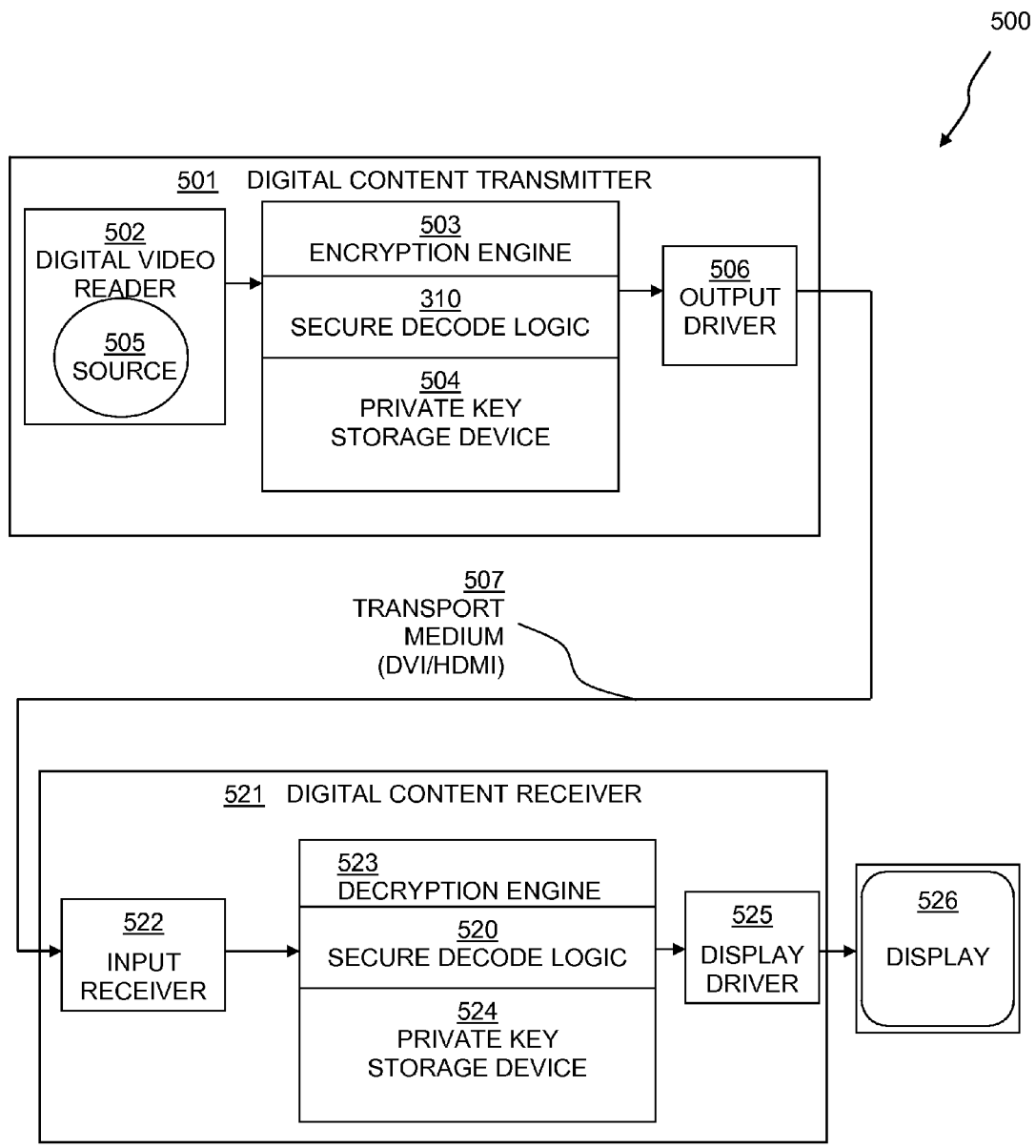
FIG. 5 illustrates a block diagram of a High-bandwidth Digital Content Protection (HDCP) system in accordance with an embodiment of the present invention.

FIG. 5 illustrates a block diagram of a High-bandwidth Digital Content delivery system 500, protected by a High-bandwidth Digital Content Protection (HDCP) protocol, that includes a digital content transmitting appliance, shown as a digital content transmitter, 501 that includes HDCP encryption engine 503, and an HDCP transport medium 507. System 500 also includes a digital content receiving appliance, shown as a digital content receiver, 521 that includes HDCP decryption engine 523. Embodiments of the present invention are not limited to HDCP applications, though HDCP appliances are well suited to Digital content transmitter 501, in this embodiment, can be any device that transmits high-bandwidth digital data that receives protection under the High-bandwidth Digital Content Protection (HDCP) protocol. Digital content transmitter 501 includes a digital video reader 502 which reads protected digital content from a source. In one embodiment of the present invention, the digital video reader 502 is a DVD drive that reads protected data from source DVD 505. However, in another embodiment, source 505 is another type of digital content source.

When the protected digital content is read at reader 502, it is encrypted by HDCP encryption engine 503 using the HDCP encryption process. The HDCP encryption process uses a system of public and private encryption keys to encrypt the digital content upon its emergence from the reader 502, thus avoiding exposing the intellectual property of the digital data to potential illegitimate copying. Encryption is accomplished by use of a selection of some encryption keys from the set of forty fifty-six-bit private HDCP keys stored in each licensed HDCP device.

Storage of the keys in private key storage device 504 is accomplished, in this embodiment, in an EEPROM. In another embodiment, the private cryptographic keys can be stored in another form of storage device. The private cryptographic keys are stored in storage device 504 in a securely encoded order. This encoded storage ensures that private keys cannot be obtained by simply copying the data stored in private keys storage device 504.

The encrypted stream of high-bandwidth digital data is output by an output driver 506 for the transport medium 507 in use in the system. In this embodiment, the transport medium 507 is a Digital Visual Interface (DVI). DVI is a common transport medium in home theater and other consumer product arenas. In another embodiment, the transport medium is a High-Definition Multimedia Interface (HDMI). In yet another embodiment, the medium is transported by some other means.

The encrypted high-bandwidth digital content is received by digital content receiver 521. Input receiver 522 is, in this embodiment, a DVI receiving device. The encrypted high-bandwidth digital data is decrypted, in this embodiment, in HDCP decryption engine 523 by the HDCP process using public keys transmitted with the high-bandwidth data and selected private keys stored in private key storage device 524 in the high-bandwidth digital content receiver. By being stored in a securely encoded order, the private keys cannot be generated by an unlicensed user by copying.

When the incoming digital content is decrypted 523, the decrypted content is sent, in this embodiment of the present invention, to the display driver 525 for display 526. This enables a DVD movie, for example, to be played and watched without ever exposing the digital content of the DVD to high-bandwidth illicit copying.

It is noted that HDCP is one of several protocols developed to protect the content of a digital stream over a transport medium, such as DVI or HDMI, from illicit copying. When a DVD, for example, is played on a licensed DVD player, HDCP encryption, for example, ensures that only encrypted high-bandwidth data emerges from the digital content transmitter 501, stopping any receiving or copying by an unlicensed device coupled to the protected transport medium 507.

Only a device that incorporates HDCP decryption is able to receive and decrypt the HDCP protected material. In this embodiment of the present invention, an unlicensed device is unable to decrypt HDCP-encrypted data, even if the unlicensed device is equipped with data copied from a private key storage device, such as EEPROM 504, from a licensed device that stores a licensed set of HDCP cryptographic keys.

In the present embodiment, the set of licensed cryptographic keys are stored in a private key storage device, in each digital protection appliance, in an encrypted manner, that is only extractable by the licensed device in which the private key storage device, with the set of keys, was originally installed. In system 500, only transmitter 501 is capable of using the set of keys stored in storage device 504, and only receiver 521 is capable of using the set of keys stored in storage device 524.

Figure 6:
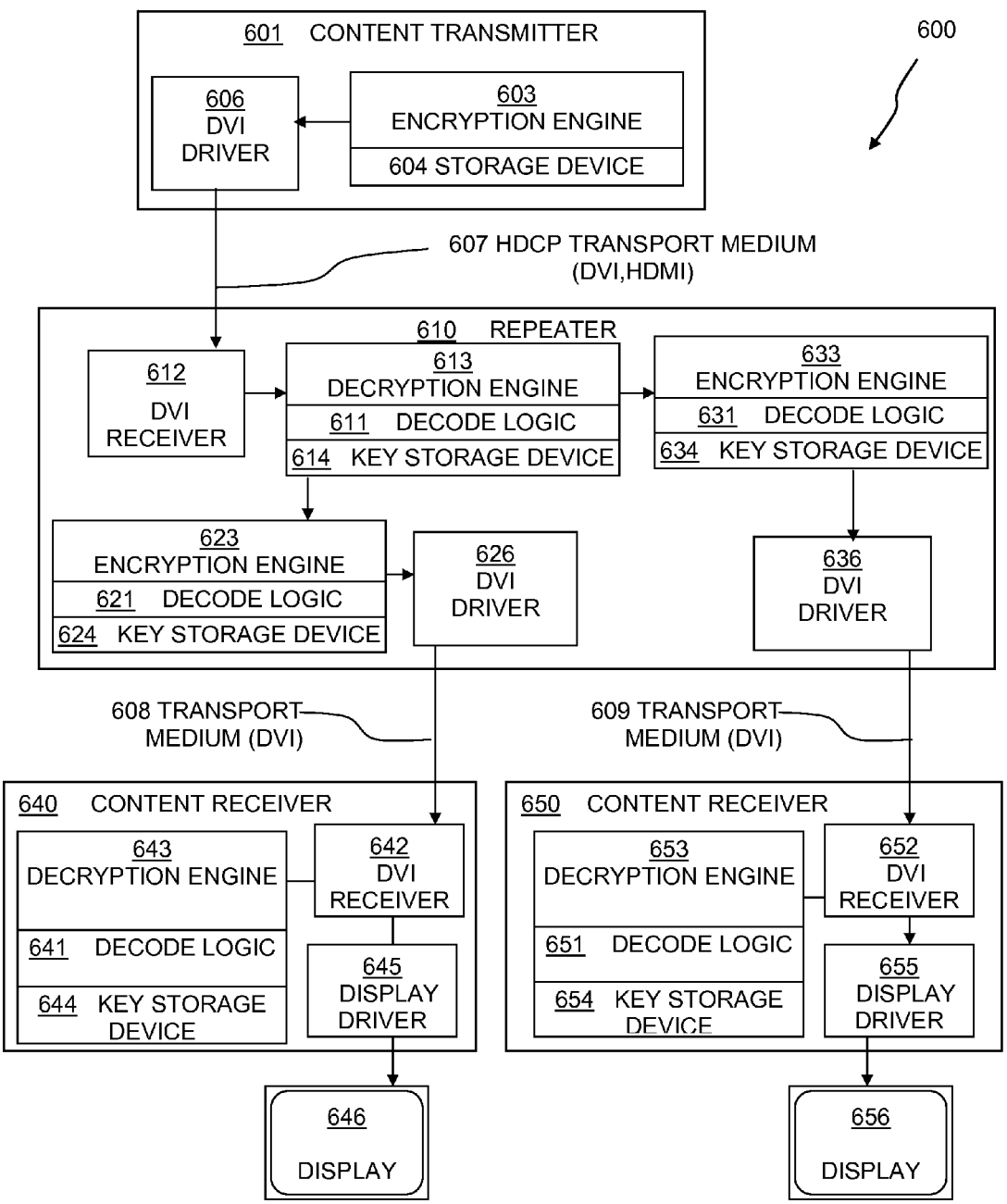
FIG. 6 illustrates a block diagram of a High-bandwidth Digital Content Protection (HDCP) system in accordance with an embodiment of the present invention.

FIG. 6 illustrates another protected digital content system 600 with an embodiment of the present invention. Here, content transmitting appliance 601 reads and encrypts 603 protected digital data and transmits it 606 over transport medium 607. The vulnerable points for possible illicit copying of high-bandwidth digital content is the transport medium 607, 608 and 609. It is noted again that the high-bandwidth digital content transported over medium 607, 608 and 609 is protected, in this example, by HDCP encryption.

Protected digital content system 600 has a repeater 611. Repeater 611 enables the stream of high-bandwidth digital content to be forwarded to more than one receiving appliance. System 600 is shown with two digital content receiving appliances 641 and 651. Repeater 611 is shown with two DVI transmitters 626 and 636 but a single receiver 612. It is noted that the term DVI used in reference to one embodiment is also intended to include references to HDMI in other embodiments. In the context of embodiments of the present invention, the terms are used interchangeably.

In system 600, each DVI receiver, 612, 642, 652, is coupled to a decryption engine, 613, 643, 653, respectively. Each receiver accepts a stream of encrypted high-bandwidth data from transport media 607, 608 and 609, respectively. In repeater 611, in this embodiment of the present invention, storage devices 614, 624 and 634 each store a separate and distinct licensed set of private cryptographic encryption keys. Thus the encrypted high-bandwidth digital stream transmitted by DVI transmitter 626 is not the same encrypted stream transmitted by DVI transmitter 636, even though the decrypted digital content of the streams is the same. In another embodiment, however, the stored encryption keys are the same set for each transmitter and receiver incorporated in the repeater.

Each transmitter 626, 636 in the repeater 611 transmits an HDCP-encrypted high-bandwidth stream via transport media 608 and 609. The streams are encrypted with the licensed private encryption keys stored in EEPROMs 624 and 634, respectively.

The encrypted high-bandwidth streams are received by receivers 642 and 652 in content receivers 641 and 651, respectively. The stream received by receiver 642 is decrypted by use of the private HDCP keys stored in EEPROM 644 and the decrypted content, in this embodiment is displayed on display 646. The stream received by receiver 652 is decrypted by use of the private HDCP keys stored in EEPROM 654 and the content is displayed on display 656.

In this embodiment, the transmitter, repeater and content receivers can be implemented in various devices. For example, content transmitter 601 can be a standalone high definition DVD player, a home theater computer with a high definition DVD drive, a legitimate online streaming high-bandwidth provider, or a set-top box with commercial cable or satellite reception. Repeater 611 can be a device within a home theater that enables multiple outputs or it can be a standalone entertainment receiver that is connected to a separate audio amplifier (content receiver 641, e.g.) and to a separate high definition video display (content receiver 651, e.g.). Transport media 607, 608 and 609 are typically DVI or HDMI cable connections between the various entities referenced above.

In each of the above exemplary applications, when high-bandwidth digital content is legitimately played, it is never exposed to illegitimate copying unless it is encrypted. However, any authenticated, licensed, device capable of receiving encrypted content is allowed to receive and decrypt the high-bandwidth content stream. Embodiments of the present invention are directed to preventing the spoofing, or deceiving, of a legitimate HDCP transmitter into authenticating and transmitting to an illegitimate receiver that has a set of valid, licensed, private cryptographic keys.

Previously, a potential illegitimate copier could purchase a legitimate, licensed, receiving or transmitting appliance, such as a DVD player or high-definition television, for example, that had a licensed set of HDCP cryptographic keys stored in storage device. The purchaser could then remove the storage device inside and copy the contents to other such storage devices for incorporation into unlicensed appliances. In this embodiment of the present invention, the set of forty, fifty-six-bit, cryptographic keys are stored in the storage device in such a way that only the licensed vendor's device can use the keys for authenticating itself with a transmitter and decrypting the transmitter's protected high-bandwidth stream.

A device and method have been disclosed for securely encoding private cryptographic keys in an appliance enabled to encrypt high-bandwidth digital content. The method consists of receiving a set of HDCP cryptographic keys and writing the set of cryptographic keys into a first storage element in the HDCP device in a secure order that is based on the content of a key in the set of cryptographic keys. The secure order is determined by a cryptographic method that can be a block interleaving method or a convolution interleaving method and a specified pair of bits in a key in the set of cryptographic keys determines the width and length of the matrix transposition of a portion of the set of cryptographic keys. The device is a storage device enabled to encrypt and decrypt the storage locations of the cryptographic keys according to the method.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

I claim:

1. A method for protecting private cryptographic keys, comprising:

receiving a set of private cryptographic keys at a device enabled to read digital content from a digital content source;

encoding said set of private cryptographic keys at said device by performing a matrix transposition of a portion of said set of private cryptographic keys using a convolution interleaving method such that the resultant transposed matrix dimensions determined by a specified set of bits in a key in said set of private cryptographic keys, wherein the transposed matrix rows and columns represent the encoded private cryptographic keys; and storing said set of encoded private cryptographic keys in a storage device of a high-bandwidth digital content appliance in said transposed matrix rows and columns, wherein at least one of said rows does not include a complete cryptographic key and at least one of said columns does not include a complete cryptographic key.

2. The method described in claim 1, wherein said high-bandwidth digital content appliance is a High-Bandwidth Digital Content Protection (HDCP) appliance.

3. The method described in claim 2, wherein said set of private cryptographic keys comprises a licensed set of private keys for HDCP appliance.

4. The method described in claim 1, wherein the matrix dimensions include a width determined by the specified set of bits in a key in said set of private cryptographic keys.

5. The method described in claim 1, wherein said the matrix dimensions include a length determined by the specified set of bits in a key in said set of private cryptographic keys.

6. The method described in claim 1, wherein said specified set of bits are the first four bits in the first key in said set of cryptographic keys.

7. The method described in claim 1, further comprising reading said set of private cryptographic keys by reference to the content of a key in said set of cryptographic keys.

8. A digital content transmitting appliance, comprising:
a reading device enabled to read digital content from a digital content source;
an encryption engine for encrypting said digital content using a set of private cryptographic keys;
a digital transport driver, enabled to drive said digital content in a digital content transport medium compliant with an encryption protocol; and
a device for secure storage of an encoded set of said private cryptographic keys, the device including a memory device comprised of memory storage locations for storing the encoded set of said private cryptographic keys and including a secure decoding logic device enabled to decode said encoded set of private cryptographic keys by performing a matrix transposition of a portion of said encoded set of private cryptographic keys using a convolution interleaving method, said portion having matrix dimensions determined by a specified set of bits in a key in said set of private cryptographic keys, wherein the decoding operation results in a transposed matrix that represents a decoded set of private cryptographic keys.

9. The digital content transmitting appliance described in claim 8, wherein said encryption engine is enabled to comply with High-Bandwidth Digital Content Protection (HDCP) cryptographic protocols.

10. The digital content transmitter described in claim 8, wherein said digital content source is a Digital Video Disk (DVD).

11. The digital content transmitter described in claim 8, wherein said digital content source is a video stream.

12. The digital content transmitter described in claim 8, wherein said reading device is an Internet communication device.

13. A digital content receiving appliance, comprising:
an input receiver for accepting encrypted digital content from a digital content transport medium;
a decryption engine for decrypting said encrypted digital content using a set of private cryptographic keys;
a display driver; and
a device for secure storage of an encoded set of said private cryptographic keys, the device including a memory device comprised of memory storage locations for storing the encoded set of said private cryptographic keys and including a secure decoding logic device enabled to decode said encoded set of private cryptographic keys by performing a matrix transposition of a portion of said encoded set of private cryptographic keys using a convolution interleaving method, said portion having matrix dimensions determined by a specified set of bits in a key in said set of private cryptographic keys, wherein the decoding operation results in a transposed matrix that represents a decoded set of private cryptographic keys.

14. The digital content receiving appliance described in claim 13, wherein said appliance is enabled to comply with High-Bandwidth Digital Content Protection (HDCP) cryptographic protocols.

15. The digital content receiver described in claim 13, wherein said input receiver is a Digital Video Interface (DVI) receiver.

16. The digital content receiver described in claim 13, wherein said input receiver is an High Definition Multimedia Interface (HDMI) receiver.

17. The digital content receiver described in claim 13, wherein said display driver is a video adapter.

18. The digital content receiver described in claim 13, wherein said display driver is an audio output device.

19. A method for protecting private cryptographic keys, comprising:
receiving a set of private cryptographic keys at a device enabled to read digital content from a digital content source;
encoding said set of private cryptographic keys at said device by performing a matrix transposition of a portion of said set of private cryptographic keys using a block interleaving method such that the resultant transposed matrix dimensions determined by a specified set of bits in a key in said set of private cryptographic keys, wherein the transposed matrix rows and columns represent the encoded private cryptographic keys; and
storing said set of encoded private cryptographic keys in a storage device of a high-bandwidth digital content appliance in said transposed matrix rows and columns, wherein at least one of said rows does not include a complete cryptographic key and at least one of said columns does not include a complete cryptographic key.

20. A digital content transmitting appliance, comprising:
a reading device enabled to read digital content from a digital content source;
an encryption engine for encrypting said digital content using a set of private cryptographic keys;
a digital transport driver, enabled to drive said digital content in a digital content transport medium compliant with an encryption protocol; and
a device for secure storage of an encoded set of said private cryptographic keys, the device including a memory device comprised of memory storage locations for storing the encoded set of said private cryptographic keys and including a secure decoding logic device enabled to decode said encoded set of private cryptographic keys by performing a matrix transposition of a portion of said encoded set of private cryptographic keys using a block interleaving method, said portion having matrix dimensions determined by a specified set of bits in a key in said set of private cryptographic keys, wherein the decoding operation results in a transposed matrix that represents a decoded set of private cryptographic keys.

21. A digital content receiving appliance, comprising:
an input receiver for accepting encrypted digital content from a digital content transport medium;

a decryption engine for decrypting said encrypted digital content using a set of private cryptographic keys;

a display driver; and a device for secure storage of an encoded set of said private cryptographic keys, the device including a memory device comprised of memory storage locations for storing the encoded set of said private cryptographic keys and including a secure decoding logic device enabled to decode said encoded set of private cryptographic keys by performing a matrix transposition of a portion of said encoded set of private cryptographic keys using a block interleaving method, said portion having matrix dimensions determined by a specified set of bits in a key in said set of private cryptographic keys, wherein the decoding operation results in a transposed matrix that represents a decoded set of private cryptographic keys.

* * * * *